Oct. 3, 1967      S. BERSUDSKY      3,344,710
SOUND SYNCHRONIZED SLIDE PROJECTOR
Filed May 26, 1965      2 Sheets-Sheet 1
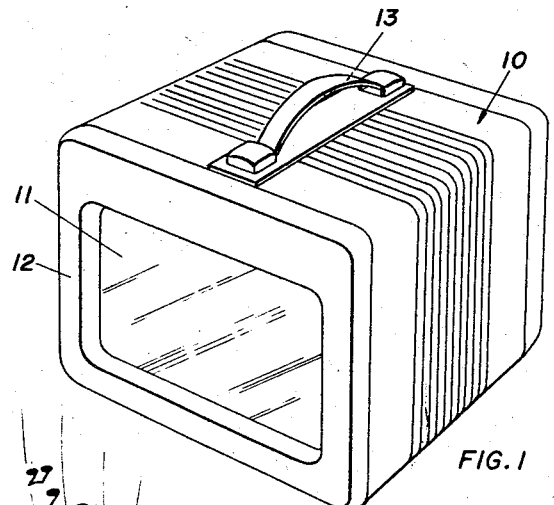
FIG. 1
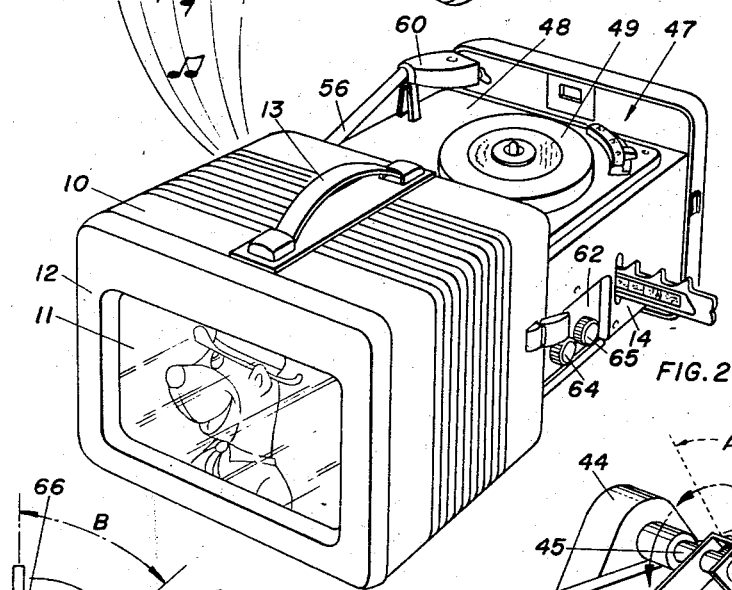
FIG. 2
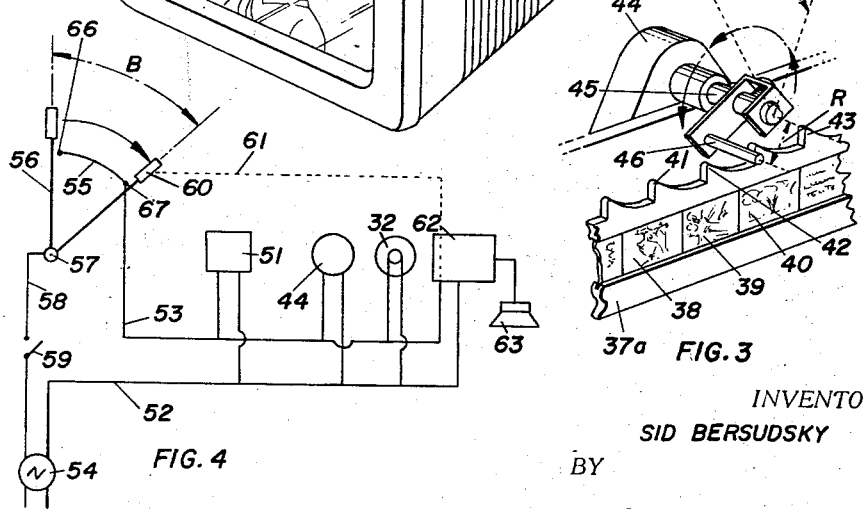
FIG. 3
FIG. 4
INVENTOR.
SID BERSUDSKY
BY
*Cavanagh & Norman*

Oct. 3, 1967  S. BERSUDSKY  3,344,710
SOUND SYNCHRONIZED SLIDE PROJECTOR
Filed May 26, 1965  2 Sheets-Sheet 2

INVENTOR.
SID BERSUDSKY
BY
Cavanagh & Norman

United States Patent Office 3,344,710
Patented Oct. 3, 1967

3,344,710
SOUND SYNCHRONIZED SLIDE PROJECTOR
Sid Bersudsky, Toronto, Ontario, Canada, assignor to National Sales Incentives Limited, Don Mills, Ontario, Canada
Filed May 26, 1965, Ser. No. 458,993
4 Claims. (Cl. 88—28)

ABSTRACT OF THE DISCLOSURE

The following invention relates to a sound and image projector for a series of film slides and a separate record therefor having a viewing sound programme. The sound synchronized slide projector comprises a housing in the form of an open-end structure and a viewing screen forming part of the opposite closed end of the housing; a sliding frame having structure for closing the open end of the housing and mounted in the housing for relative slidable positioning with respect to the screen; a slide projector on the frame adapted to focus a slide image on the screen when the frame is moved to a predetermined viewing extension relative to the housing; a record reproducer including an electric motor and a tone arm also mounted on the frame exposable to the operator at the viewing extension position and a record having a predetermined programme therefor; step motion means including a motor for the projector for successively projecting a programme of viewing slides over a predetermined programme period of time upon energizing of the motor thereof; and switch means actuated by manual motion of the tone arm to a sound reproducing position for energizing and de-energizing both motors simultaneously at the start and end positions for the arm relative to the programme of the record.

---

This invention relates to a sound synchronized slide projector and method.

Film slide projectors adapted cyclically to successively project a film strip or slide series are known. Attempts have been made to provide a separate recording and sound record reproducer to provide a musical background to be associated with such film projection. Such equipment requirements are substantially impractical for sales demonstration purposes and are so complex that the same cannot be used by children.

Heretofore equipment has been provided which embodied a projector and an associated record reproducing unit on a single frame but wherein the projector is adapted to project a slide image on a distant screen. No synchronization is provided for the sound reproduction and the feeding of the film strip through the projector.

It has been discovered according to this invention that any solution to the problem of synchronizing sound reproduction with a film strip programme timing is only capable of solution in a practical way by providing a very large tolerance in the sound programme itself. In this way the costly slide by slide synchronizing of the projected images with the sound record is eliminated and yet the projection programme and sound programme over the total programme period of each is satisfactorily synchronized giving for all practical purposes an entirely satisfactory effect of true synchronization.

Further the invention provides for a viewing screen contained within the projection unit itself in such manner that all equipment is contained in the one unit and the unit is adapted to be opened up to display the sound reproducing unit for manual control of same and simultaneously effecting a correct focusing of the film slide projection unit.

It is a still further object of the invention to provide a film slide projection device embodying a sound programme reproducing means of a predetermined programme period corresponding to the programme period of the slide programme and wherein the slide programme and sound programme are simultaneously initiated by the operator initiating the sound programme.

Having regard to the foregoing the invention generally concerns a sound and image projector for a series of film slides and a separate record therefor having a viewing sound programme comprising: a housing in the form of an open-ended structure and a viewing screen forming part of the opposite closed end thereof said screen presenting an externally viewable image when receiving an image projected thereon within said housing; a sliding frame having structure for closing the open end of said housing and mounted in the latter for relative slidable positioning with respect thereto; a slide projector on said frame adapted to focus a slide image on said screen when said frame is moved to a predetermined viewing extension relative to said housing; a record reproducer including an electric motor and a tone arm therefor on said frame exposable to the operator at said viewing extension and a record having a predetermined programme therefor; step motion means including a motor for said projector for successively projecting a programme of viewing slides over said predetermined programme period of time upon energizing of the motor thereof; and switch means actuated by manual motion of said tone arm to a sound reproducing position for energizing and de-energizing both said motors simultaneously at start and end positions for said arm relative to the programme of said record.

Other objects of the invention will be appreciated by a study of the following specification taken in conjunction with the accompanying drawings.

In the drawings:

FIGURE 1 is a perspective view of the projector device of the invention;

FIGURE 2 illustrates the device of FIGURE 1 with the inner frame carrying record reproducing and film slide projecting means withdrawn from the housing to provide the projected image on the viewing screen of the housing;

FIGURE 3 is an enlarged perspective detail of mechanism for cyclically and successively advancing film slides in the film projector unit of FIGURE 2;

FIGURE 4 is an electrical schematic of the synchronizing control for the sound projector and film projector units of FIGURE 2;

Figure 5:
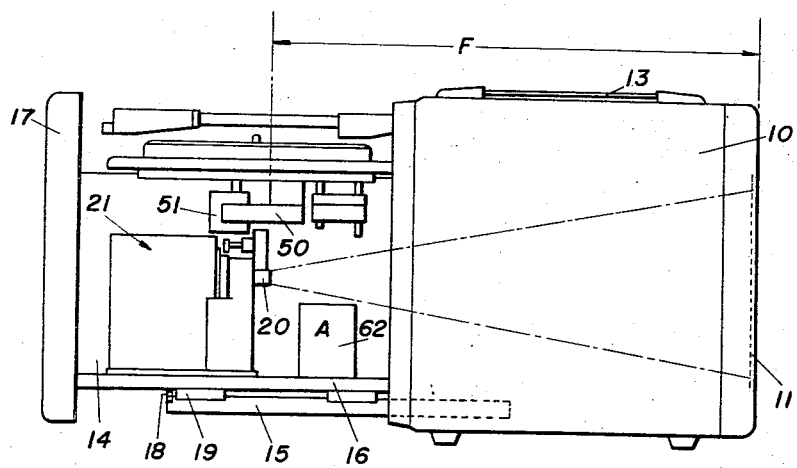
FIGURE 5 is a side elevation showing parts in section of the device of FIGURE 2.

There are two general conditions which are required to be met according to the concept of this invention. The sound programme and the film programme begin substantially simultaneously but the sound programme is so contrived as to provide apparent synchronization with a predetermined viewing programme. The viewing programme is made-up of a series of equal viewing periods each comprising a stationary period and a shifting period wherein the shifting period according to this invention is equal to about one-quarter in duration of the stationary period i.e. about one-fifth of the cycle time. The sound programme is designed to provide the same number of messages as are described by the film programme and description of each film being timed with the primary message information spaced on sound record at similar time spacing. The sound infomation may likewise be regarded as cyclic although it is played continuously because the primary information to identify the corresponding viewing slide is limited to about one-quarter of the total cyclic period of information which can apply to the corresponding film slide. In this way the sound information may be of a tolerance of plus or minus four to five seconds relative to the middle of the viewing period of a particular slide and yet give full satisfaction to the viewing listener as to relevance and synchronism with the viewing programme. The sound record information is of a general kind which may apply as well to adjacent picture slides in the viewing slide programme.

Thus for example assume that one picture slide of a series concerning "The Fall of the Alamo" embodies one slide showing a view of the Alamo building structure itself which is available for a viewing period of twelve seconds. The sound record programme need only identify the building structure as the Alamo at some point during the twelve seconds and the remainder of the sound programme in relation to this slide may deal with story content and historical information or persons who are not shown but who are interesting relative to the structure. The sound programme will continue during the shift period of three seconds following the viewing period to reveal a new viewing slide perhaps showing a particular point of interest in the building itself. Again such point of interest need not be identified in particular at any other time than twelve seconds after the identity of the previous critical primary information and it will still arrive during the viewing period of this following slide.

Having regard to these two general factors described it should be understood that the mechanism of the invention according to the concepts herein may be provided in relatively simple form as described by way of example in FIGURES 1 to 7 hereof.

In FIGURE 1 one suitable form of housing 10 is shown having a screen viewing face 11 in the form of an inner frosted glass pane supported in the front frame 12 which latter is fixed to housing 10 to form part of the structure thereof. Carrying handle 13 enables the device to be provided in personal portable form. The housing 10 thus is in the form of an open-ended structure with the viewing screen 11 being adapted to present an externally viewable image if receiving an image projected thereon from within the housing.

As will be evident in FIGURES 2 and 5 a sliding frame 14 is slidable on conventional telescopic track devices 15 and 16 from enclosure within housing 10 and carries an enclosure 17 movable therewith. Stop means 18 and track 15 fixed to housing 10 provide a limit for sliding members 19 of track 16 thereby establishing a focusing distance F between a projecting lens structure 20 and screen 11. Lens 20 forms a part of a film slide projector device 21 of the invention and revealed in more detail in FIGURES 3, 6 and 7.

Figure 6:
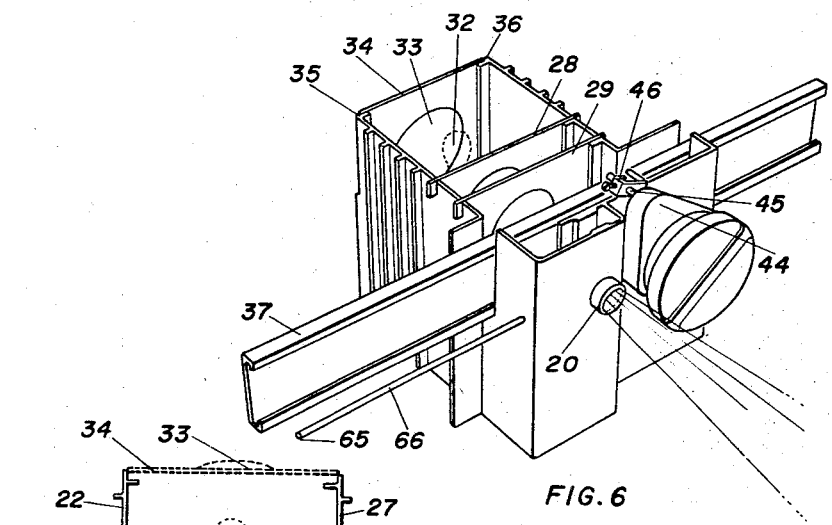
FIGURE 6 is a perspective of the film slide projector unit.
Figure 7:
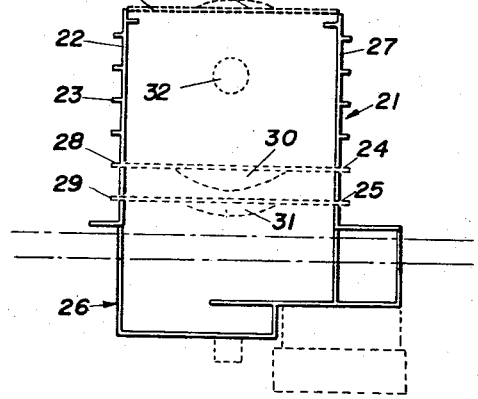
FIGURE 7 is a plane view of the projector of FIGURE 6 revealing a preferred form of extrusion defining the structure of the projector casing.

Slide projector 21 preferably is formed by an extruded aluminum projector housing 22 having integrally extruded heat radiating fins 23 thereon and notched as at 24 and 25 in side walls 26 and 27 to accommodate the lens plates 28 and 29 carrying light condenser lenses 30 and 31. A lamp 32 shown in chain lines in FIGURES 6 and 7 is a conventional projection lamp and has associated therewith a reflector 33 formed in a rear wall stamping 34 adapted to be fastened to the rear edges 35 and 36 of the housing 27.

The housing is cut away forwardly of the condensing lens 31 and rearwardly of projection lens 20 to accommodate fixed guide 37 for viewing slide carrier 37a shown in more detail in FIGURE 3 and carrying a series of film slides or transparencies 38, 39 and 40 for example each of a physical width corresponding to the distance between upstanding ratchet fingers 41, 42, 43 respectively therefor. A conventional clock timing drive motor 44 having a driving output shaft 45 effects rotation of the slide actuating arm 46 on a radius R at a speed preferably of about 4 r.p.m. The geometry of the ratchet fingers 41, 42, 43 as to their height is related to the radius R such that the shaft angle i.e. the angle through which the arm moves during shifting of the slide carrier 37a is of the order of preferably 72° for a 35 mm. slide. If this angle is designated as A the relationship is such that the width W of each slide frame is:

$$W = 2R \sin \frac{A}{2}$$

for a condition in which the dwell is equal to substantially four times the shift time.

The invention also embodies the record playing sound record player 47 having a conventional turntable structure 48 with the rotatable platen 49 driven by conventional electric drive motor mechanism 50 the electric motor 51 of which is in parallel electric circuit relationship by lines 52 and 53 with the picture viewing slide actuating motor 44 as shown in FIGURE 4. Line 52 connects to a source of electrical power 54. Line 53 connects to the radial contactor 55 adapted to be electrically engaged by contact (not shown) but in electrical circuit from a physical mounting on the reproducing tone arm 56 pivoted as at 57 in relation to the rotatable record platen 49 of FIGURE 2. It is to be understood that electrical lead 58 leads from such tone arm through a manual switch 59 to the power source 54. The pickup head 60 of tone arm 56 communicates an electrical signal from its pickup transducer (not shown) by signal line 61 shown in chain lines in FIGURE 4 to amplifier 62 and sound output speaker 63 the amplifier being preferably also in circuit power with motor 51. Similarly the projection lamp 32 is preferably in parallel electric circuit with the drive motor 51. Preferably further switch 59 adapted for control by the volume control knob 64 of amplifier 62 which is associated with a focusing knob 65 communicating by rod 66 as shown in FIGURE 6 to a worm gear structure (not shown) adapted to rotate lens 20 in a conventional thread mounting (not shown) therefor thereby to adjust same to improve clarity of the viewing image produced on screen 11.

In the preferred circuit arrangement all electrical devices are actuated simultaneously by motion of the control arm 56 from its position of rest indicated in FIGURE 2 to a record starting position as at 66 of FIGURE 4 of contactor 55. During reproduction of the sound record accomplishing radial motion of the tone arm through an angle "B" the radial number of grooves in the record and the speed of rotation of the rotatable plate in 49 will define a period of time which should correspond in its total time to that of the time necessary to cycle through the viewing projector apparatus a predetermined series of viewing slides of predetermined width. Thus in the example above given the sound programme should be of four minutes duration at the termination of which the tone arm 56 is beyond the end limit contacting position 67 of contactor 55. The tone arm is manually actuated. An error in operation due to the delay of the operator in placing the tone arm onto the rotating record has been found to be in no way critical to satisfactory operation of the device of the invention due to the substantial tolerance afforded in the correlation of primary sound information and the viewing slide information being substantially in total greater than 50% of a full cycle period of one element of viewing information. Thus in a five minute programme the sound programme can be as much as nine seconds late according to this invention and still appear to be perfectly synchronized in all respects with the viewing programme.

It is intended that the present disclosure should not be construed in any limiting sense other than that indicated by the scope of the following claims.

What I claim is:

1. A sound synchronized slide projector for a series of film slides and a separate record therefor having a viewing sound programme comprising: a housing in the form of an open-ended structure and a viewing screen forming part of the opposite closed end thereof said screen presenting an externally viewable image when receiving an image projected thereon within said housing; a sliding frame having structure for closing the open end of said housing and mounted in the latter for relative slidable positioning with respect thereto; a slide projector on said frame adapted to focus a slide image on said screen when said frame is moved to a predetermined viewing extension relative to said housing; a record reproducer including an electric motor and a tone arm therefor on said frame exposable to the operator at said viewing extension and a record having a predetermined programme therefor; step motion means including a motor for said projector for successively projecting a programme of viewing slides over said predetermined programme period of time upon energizing of the motor thereof; and switch means actuated by manual motion of said tone arm to a sound reproducing position for energizing and de-energizing both said motors simultaneously at start and end positions for said arm relative to the programme of said record.

2. A sound synchronized slide projector as claimed in claim 1 in which the sound programme of the sound record comprises a plurality of primary units of sound information each embodying information correlating with the information of the series of film slides and in the same order and spaced in timing corresponding to the space in timing of the projection of said slides by said projector and containing a continuous remainder of sound information of a nature uncorrelated with any one of said film slides but concerning the general and associated subject matter thereof.

3. A sound synchronized slide projector as claimed in claim 1 in which said step motion means embodies a rotatable driving arm movable at a predetermined radius R and ratchet fingers associated with said film slides having a height relative to such radius effecting a sliding motion during actuation by said arm providing a dwell time of substantially four times the shift time.

4. A sound synchronized slide projector as claimed in claim 1 in which said step motion means embodies a rotatable driving arm movable at a predetermined radius R and ratchet fingers associated with said film slides having a height relative to such radius effecting a sliding motion during actuation by said arm providing a dwell time of substantially four times the shift time in accordance with the relation $$W = 2R \sine \frac{A}{2}$$

where W is the width of each film slide and A is the angle of rotation effecting shift.

References Cited
UNITED STATES PATENTS

| | | | |
|---|---|---|---|
| 3,187,626 | 6/1965 | Mindell et al. | 88—28 |
| 3,207,033 | 9/1965 | Guber | 88—28 |

NORTON ANSHER, *Primary Examiner.*

R. M. SHEER, *Assistant Examiner.*